(12) United States Patent
Maar et al.

(10) Patent No.: US 12,180,855 B2
(45) Date of Patent: Dec. 31, 2024

(54) ROTOR BLADE FOR A TURBOMACHINE

(71) Applicant: MTU Aero Engines AG, Munich (DE)

(72) Inventors: Karl Maar, Munich (DE); Franz Malzacher, Munich (DE); Martin Pernleitner, Munich (DE)

(73) Assignee: MTU Aero Engines AG, Munich (DE)

( * ) Notice: Subject to any disclaimer, the term of this patent is extended or adjusted under 35 U.S.C. 154(b) by 23 days.

(21) Appl. No.: 17/757,621

(22) PCT Filed: Dec. 14, 2020

(86) PCT No.: PCT/DE2020/000332
§ 371 (c)(1),
(2) Date: Jun. 17, 2022

(87) PCT Pub. No.: WO2021/121458
PCT Pub. Date: Jun. 24, 2021

(65) Prior Publication Data
US 2023/0025455 A1    Jan. 26, 2023

(30) Foreign Application Priority Data
Dec. 20, 2019   (EP) .................... 19218506

(51) Int. Cl.
*F01D 5/14*     (2006.01)
*F01D 5/28*     (2006.01)

(52) U.S. Cl.
CPC ........ *F01D 5/141* (2013.01); *F05D 2220/323* (2013.01); *F05D 2240/30* (2013.01)

(58) Field of Classification Search
CPC .......... F01D 5/141; F01D 5/147; F01D 9/041; F01D 5/28; F04D 29/324; F04D 29/384; F04D 29/388; F04D 29/544; F04D 29/666; F04D 29/681; F05D 2240/301; F05D 2240/303; F05D 2250/70; F05D 2220/32; F05D 2220/323; F05D 2250/712; F05D 2240/24; F05D 2240/307; F05D 2240/30; F05D 2240/12; F05B 2240/301; Y02T 50/60
See application file for complete search history.

(56) References Cited

U.S. PATENT DOCUMENTS

| 2001/0024722 | A1* | 9/2001 | Matsuhisa | D01F 11/14 428/367 |
| 2009/0226322 | A1 | 9/2009 | Clemen | |
| 2015/0285080 | A1 | 10/2015 | Huebner et al. | |
| 2018/0231018 | A1 | 8/2018 | Smith et al. | |
| 2021/0215103 | A1* | 7/2021 | Bousfield | F02C 7/05 |

FOREIGN PATENT DOCUMENTS

| EP | 1927724 A2 | 6/2008 |
| EP | 2927427 A1 | 10/2015 |

* cited by examiner

Primary Examiner — Eric J Zamora Alvarez
(74) Attorney, Agent, or Firm — Abel Schillinger, LLP

(57) ABSTRACT

The present invention relates to a rotor blade (20) for arrangement in a gas duct (2) of a turbomachine (1), having a rotor blade airfoil (23), which, viewed in a tangential section, has a blade airfoil profile (24) with a leading edge radius RVK and a rotor blade airfoil thickness d, wherein the blade airfoil profile (24) is thickened, at least in sections, specifically the blade airfoil thickness d is specified, in relation to the front edge radius RVK, such that $(2d/R_{vk}^2)-d \leq 5.5$.

17 Claims, 4 Drawing Sheets

ROTOR BLADE FOR A TURBOMACHINE

TECHNICAL FIELD

The present invention relates to a rotor blade for a turbomachine.

PRIOR ART

The turbomachine may be, for example, a jet engine, e.g., a fanjet. In functional terms, the turbomachine is made up of a compressor, a combustion chamber and a turbine. In the case of the jet engine, for instance, sucked in air is compressed by the compressor and, conjointly with added kerosene, combusted in the downstream combustion chamber. The hot gas created, a mixture of combustion gas and air, flows through the downstream turbine and is expanded in the process. The turbine is typically constructed from a plurality of stages each having a stator (guide vane assembly) and a rotor (rotor blade assembly), the rotors being driven by the hot gas. Inherent energy is proportionally extracted from the hot gas at each stage, said inherent energy being converted into a movement of the respective blade ring and thus of the shaft.

The present subject matter relates to a rotor blade for arrangement in the gas duct of the turbomachine. The rotor blade can generally also be used in the field of compressors, thus be disposed in the compressor duct; an application in the field of turbines is preferable, said rotor blade thus being placed in the hot gas duct.

SUMMARY OF THE INVENTION

The present invention is based on the technical problem of specifying a particularly advantageous rotor blade.

According to the invention, this is achieved by the rotor blade as set forth in the claims. In brief and simple terms, the rotor blade airfoil of said rotor blade is embodied so as to be thickened at least in portions in comparison to a basic design that is optimized solely in aerodynamic terms. In the (solely) aerodynamic optimization, the front edge radii are chosen to be very small. However, the inventors have established that the targeted thickening of the profile opens up design possibilities with a view to being able to improve the mechanical robustness of the structure. According to the main claim, the thickening of the blade airfoil profile is specified by way of the ratio between the thickness d of said blade airfoil and the front edge radius $R_{VK}$ in that $$\frac{2 \times d}{R_{VK}^2} - d \quad \text{(Formula 1)}$$

is at most 5.5. Further advantageous upper limits, increasingly preferable in the order mentioned, are at most 5.0, 4.5 and 4.0.

Using the thickening, a more robust profile having a higher tolerance in terms of impact can be implemented on the one hand, thus a profile which is more resistant to impact stresses. Moreover, the thickening can also be advantageous during maintenance; specifically higher post-machining limits can be assigned when machining damaged areas, for example. On the other hand, the design measure according to the main claim still results in a fluidically acceptable profile; the aerodynamic properties are thus not significantly changed.

The blade airfoil thickness d and the front edge radius $R_{VK}$ are to be inserted into the formula as variables stated in millimeters, although the calculation is per se without units. For the desired enhancement of the tolerance in terms of impact, the blade airfoil is to be thickened at the front edge, or in a region disposed therein, respectively. In terms of a spacing A which is measured along the skeletal line from the front edge, the Formula 1 can be met at least in a spacing range of, for example, between 1 mm and 2.5 mm, said Formula 1 preferably applying at least in a spacing range between 0.7 mm and 2.8 mm. The Formula 1 can in particular be met at spacing values A of 1 mm and/or 1.5 mm and/or 2 mm and/or 2.5 mm.

The blade airfoil is thus in any case thickened in a region proximal to the front edge, wherein a thickening may also be present further toward the rear (cf. FIG. 2 for illustration). This thickening can result from aerodynamic profiling, for example, thus a continuation of the profile toward the rear edge without any aerodynamically disadvantageous reversal points. The larger front edge radius can also result in a profile with a larger surface content, for example, this potentially reducing the mean tension in the individual profile sections and thus enhancing the tolerance in terms of impact. The thickening of the profile at the pressure side can be advantageous in that, for example, the profile face can be increased without any axial lengthening of the chord length, this leading to reduced tension. In this way, an increase in the axial construction length and thus the axial length of the turbine stage, or of the module, respectively, can in particular be minimized or avoided, respectively.

Preferred embodiments can be found in the dependent claims and the disclosure as a whole, a distinction between aspects of the device and method and/or use not always being specifically made in the representation of the features; however, the disclosure should be read implicitly with a view to all of the categories of the claims. For example, when the advantages of the rotor blade are described in one specific application, this is to be read as a disclosure of the correspondingly configured rotor blade as well as of such a use.

The indications "axial", "radial" and "encircling", as well as the associated directions (axial direction, etc.), relate to the rotation axis about which the rotor blade rotates when in operation. Said rotation axis typically coincides with a longitudinal axis of the engine or engine module, respectively. The blade airfoil profile is viewed in a tangential section, thus in an axially parallel section plane. In this tangential section the front edge radius $R_{VK}$ is determined by a circle that fits into the front edge region (see below), and the blade airfoil thickness d is in each case derived perpendicularly between the face of the blade airfoil on the suction side and the pressure side. The skeletal line is established through the centers of circles that fit into the profile such that each of the circles touches the face on the suction side and the pressure side.

In some embodiments, the front edge radius $R_{VK}$ is smaller than 2 mm. In particular, $R_{VK}$ can be ≤1.8 mm, ≤1.4 mm and/or ≤1.3 mm. Moreover, the front edge radius $R_{VK}$ can be ≥0.2 mm, ≥0.6 mm and/or ≥0.7 mm.

In some embodiments $R_{VK}$ is in the range from 0.6 mm to 1.4 mm, in particular from 0.8 mm to 1.0 mm, or from 0.1 mm to 1.3 mm.

Additionally or alternatively, the blade airfoil thickness d in the front edge region, in particular in the case of values of the aforementioned spacing A in the range from 1 mm to 2.5 mm, can be between 0.5 mm and 5 mm, preferably between 1.5 mm and 4 mm, in particular between 2 mm and 2.5 mm.

In a preferred embodiment the blade airfoil thickness d and the front edge radius $R_{VK}$ are adapted in such a manner that $$\frac{2 \times d}{R_{VK}^2} - d \qquad \text{(Formula 1)}$$

is at least 0.6. Further advantageous lower limits, increasingly preferable in the order mentioned, are 0.7, 0.8 and 0.9. In general, the flow losses can be kept low by the present subject matter in particular even when profiles of dissimilar thicknesses are provided for reasons of vibration technology (detuning). In this instance, a separation bubble on the pressure side on the thin profile can at least be partially or else completely avoided, for example, this keeping the overall flow loss low.

A front edge region in which the blade airfoil profile has the front edge radius $R_{VK}$, in terms of the spacing A measured along the skeletal line, reaches preferably up to at least 0.10 mm, furthermore preferably at least 1.50 mm. Potential upper limits, increasingly preferable in the order mentioned, can be at most 0.30 mm, 0.25 mm and 0.20 mm. These spacing values are in each case transferred to the suction side and pressure side face by way of a straight line perpendicular to the skeletal line; said straight line intersects the skeletal line at 1.50 mm, for example, when the front edge region reaches up to this spacing A.

The blade airfoil height H is measured from radially inside to the outside, thus from the blade root, or the inner shroud, respectively, to the blade tip, or to the outer shroud, respectively. The rotor blade airfoil can be thickened across the entire blade airfoil height H or else only in a section of the latter. In a preferred embodiment the blade airfoil thickness d is in any case increased at the radial positions between 60% and 90% of the rotor blade airfoil height H, the ratio according to the main claim thus being met in tangential sections at these radial positions. This particularly preferably applies in any case to the radial positions between 50% and 90% of the rotor blade airfoil height H. The inventors have established that the frequency of strikes and the impact stress that results from the velocity and the mass are not distributed uniformly in radial terms but are higher radially toward the outside. Therefore, the rotor blade airfoil is in any case embodied so as to be thickened there.

One preferred embodiment relates to a ratio of the blade airfoil thickness d and the front edge radius $R_{VK}$, as well as additionally the chord length l. The chord length, like the front edge radius $R_{VK}$ and the rotor blade airfoil thickness d, are measured on the blade airfoil profile. In detail, the length in this instance is measured along a connecting tangent which in the tangential section lies on the profile on the pressure side and does not intersect the blade airfoil and has two intersection points with the blade airfoil (in the region of the front edge and in the region of the rear edge). The chord length along these connecting tangents then results as a spacing between a front and a rear tangent, wherein the front and the rear tangent lie in each case so as to be perpendicular to the connecting tangent and contact (but do not intersect) the blade airfoil at the front (front tangent) and at the rear (rear tangent).

According to one preferred embodiment which, independently of the ratio between the blade airfoil thickness d and the front edge radius $R_{VK}$ according to the main claim, is also considered to be an invention and to be disclosed, the thickness d of the rotor blade airfoil, the front edge radius $R_{VK}$ and the chord length are set in such a manner that $$\frac{d}{R_{VK} \times l} \qquad \text{(Formula 2)}$$

is at most 7.2. Further advantageous upper limits, increasingly preferably in the order mentioned, are at most 7.0, 6.9, 6.8, 6.7, 6.6 or 6.5, respectively. Advantageous lower limits, increasing preferably in the order mentioned, are 4.0, 4.2 or 4.4, respectively. In this case too, the values are entered in millimeters, and the calculation is performed without units. Using this design rule, a mechanically robust profile of the structure can again be implemented, said profile nevertheless having positive aerodynamic properties, on the other hand.

This criterion in a preferred embodiment is in any case met in a spacing range between 1 mm and 2 mm from the front edge (in terms of the spacing A measured along the skeletal line), particular preferably between 0.7 mm and 2.5 mm, respectively. In comparison to the design rule discussed at the outset, this criterion is optionally somewhat more critical in terms of the front edge spacing, which is why the range lies closer to the front edge. This criterion can in particular be met at spacings A of 1 mm and/or 1.5 mm and/or 2 mm and/or 2.5 mm.

According to one preferred embodiment, at least the rotor blade airfoil, preferably the entire rotor blade, is provided from a brittle material. A brittle material which has a maximum total elongation of less than 6%, preferably less than 4%, in particular less than 2%, may be more critical in terms of the mechanical aspects of the structure, thus also have a higher susceptibility to impacts. On the other hand, the possibility of providing a more brittle material, as enabled by the thickening according to the invention, may make accessible interesting materials that are advantageous for the entire system.

According to one preferred embodiment, the rotor blade airfoil is provided from a high-temperature resistant material. "High-temperature resistant" can mean, for example, a suitability for temperatures up to at least 700° C. or even 800° C., wherein such a high temperature resistance is typically associated with low ductility. This results in a greater susceptibility to impacts, the latter being counteracted by the feature or features described herein. Here, modifications to the microstructure in order to increase the ductility of the brittle material are also possible.

The high-temperature resistant material can in particular be titanium aluminide, preferably an intermetallic TiAl material, or a TiAl alloy, respectively. In the scope of the invention, these are understood to be materials which comprise titanium and aluminum as the main components, as well as intermetallic phases, for example Ti3Al, γ-TiAl. The blade airfoil or the blade, respectively, can in particular be provided from a TNM alloy (titanium, niobium molybdenum, for example a proportion of 43.5 at. % Al, 4 at. % Nb, 1 at. % Mo, and 0.1 at. % boron, the balance being formed by titanium or unavoidable impurities, respectively).

The rotor blade airfoil, preferably the entire rotor blade, can be produced (in particular from the high-temperature resistant material) by, for example, casting, forging and/or generative manufacturing as well as final contour machining. In addition to the rotor blade airfoil and the already mentioned outer shroud, the rotor blade can have a rotor blade root, for example, which can be assembled in a rotor disk. The rotor blade, conjointly with one further or a plurality of rotor blades, can be combined so as to form an integral multi-segment; likewise, said rotor blade may be part of a Blisk (Blade Integrated Disk).

According to one preferred embodiment, the blade airfoil is a solid profile, thus not a hollow profile or hollow blade airfoil, respectively. The blade airfoil is thus free of cavities (has no cavities) in the tangential portion.

In a preferred design embodiment the rotor blade is conceived for a high-speed rotor, in particular of a high-speed turbine module. "High speed" values here are considered to be $An^2$ values of at least 2000 $m^2/s^2$, increasing preferably in the order mentioned, at least 2500 $m^2/s^2$, 3000 $m^2/s^2$, 3500 $m^2/s^2$, 4000 $m^2/s^2$, 4500 $m^2/s^2$, or 5000 $m^2/s^2$, respectively (potential upper limits can be at, for example, at most 9000 $m^2/s^2$, 7000 $m^2/s^2$ or 6000 $m^2/s^2$, respectively). In a conventional rotor blade that is not conceived for high-speed operation, $An^2$ can be approximately 1800 $m^2/s^2$, for example. In general, $An^2$ is derived by way of the annular area, in particular at the exit, multiplied by the rotating speed in the ADP range squared. The ADP (Aerodynamic Design Point) is derived under cruise conditions at cruising altitude, it is thus distinguished by ideal incident flow conditions and the best efficiency and thus the lowest consumption. Alternatively, if the revolving speed at the blade tip (radially outside) is taken as a reference, said revolving speed in the case of a conventional rotor blade can thus reach up to at most 220 m/s, for example, in the case of a high-speed rotor vane can however be more than 300 m/s or even 400 m/s.

The invention also relates to a turbine module for an aircraft engine, in particular a geared turbofan engine, having a rotor blade as disclosed herein. The turbine module here can in particular be conceived for a "high-speed" operation of the rotor blade, cf. the statements in the preceding paragraph. By virtue of the coupling by way of the gearbox, the turbine module during operation can rotate faster than the fan of the aircraft engine (this being the meaning of "high-speed"). The turbine module can be, for example, a low-pressure turbine module.

The invention also relates to the use of a rotor blade disclosed herein, or of a turbine module, wherein the rotor blade rotates at an $An^2$ of at least 2000 $m^2/s^2$; reference is made to the preceding statements.

BRIEF DESCRIPTION OF THE DRAWINGS

The invention will be explained in more detail hereunder by means of an exemplary embodiment, wherein the individual features in the context of the coordinate claims may also be relevant to the invention in any other combination and, furthermore, no distinction is made in detail between the different categories of claims.

In the drawings.

PREFERRED EMBODIMENT OF THE INVENTION

Figure 1:
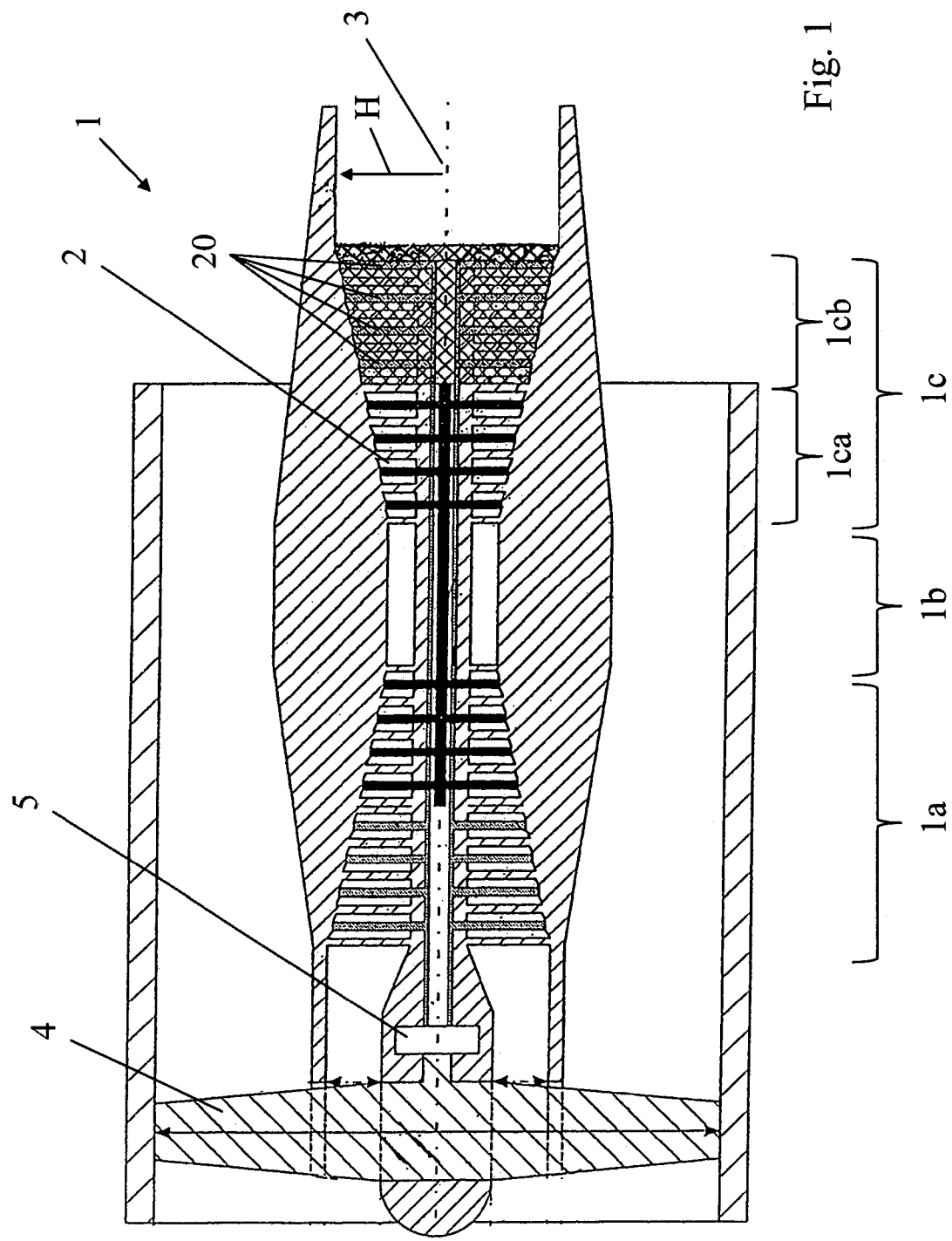
FIG. 1 shows a fanjet in an axial section.

FIG. 1 shows a turbomachine 1 in a schematic view, specifically a fanjet. The turbomachine 1 in functional terms is made up of a compressor 1a, a combustion chamber 1b and a turbine 1c, the latter having a high-pressure turbine module 1ca and a low-pressure turbine module 1cb. Here, the compressor 1a as well as the turbine 1c are in each case constructed from a plurality of stages, each stage being composed of a guide vane assembly and a rotor blade assembly. In terms of the circulating flow in the gas duct 2, one stage of the rotor blade assembly is disposed downstream of each guide vane assembly. The rotor blades in operation rotate about the longitudinal axis 3. The fan 4 is coupled by way of a gearbox 5; the rotor blade assemblies of the low-pressure turbine module 1cb rotate in operation faster than the fan 4. The reference sign 20 in an exemplary manner identifies some rotor vanes.

Figure 2:
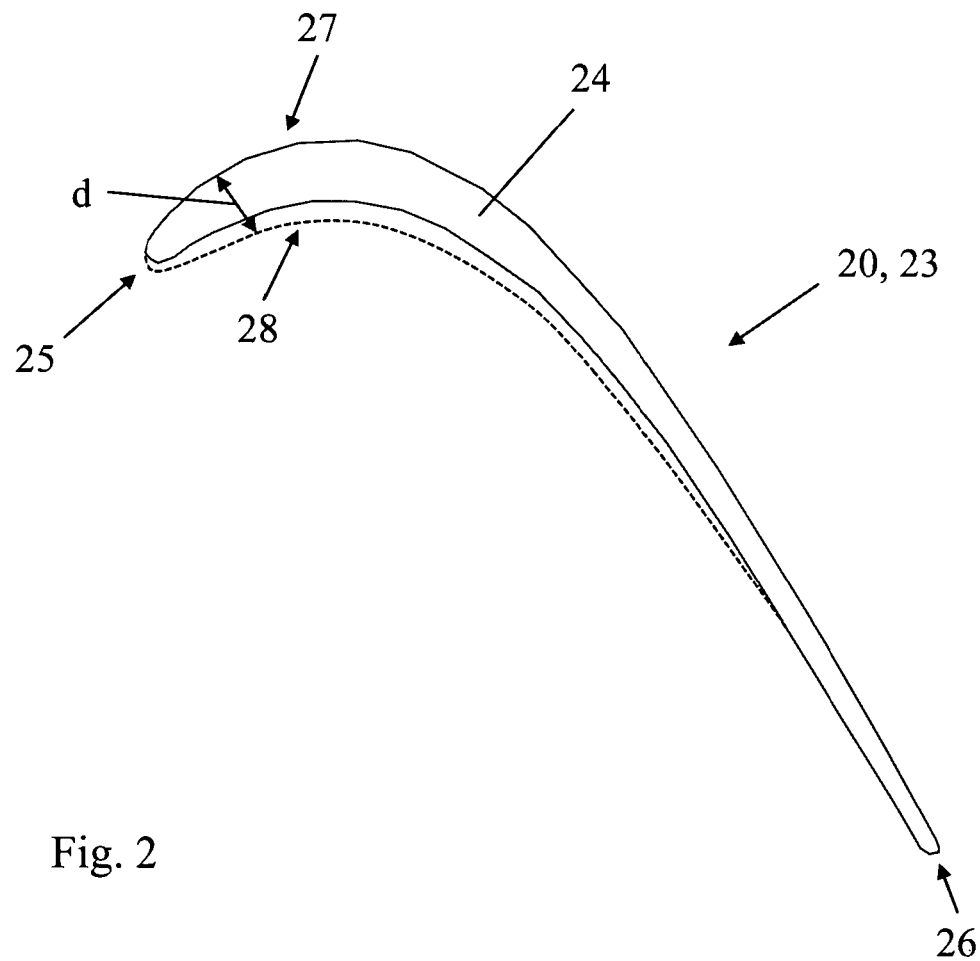
FIG. 2 shows a blade airfoil profile of a rotor blade designed according to the invention with a comparative profile.

FIG. 2 shows a rotor blade airfoil 23 for a rotor blade 20 of the turbine 1c, specifically of the low-pressure turbine module 1cb, in a tangential section. In relation to FIG. 1, the section plane thus lies so as to be perpendicular to the drawing plane and is horizontal. FIG. 2 thus shows the blade airfoil profile 24 which is defined so as to extend from a front edge 25 up to a rear edge 26 between a suction side 27 and a pressure side 28.

A profile which is optimized solely in aerodynamic terms is identified by the solid lines in FIG. 2. As has been set forth in detail in the introductory description, this can however be mechanically disadvantageous in terms of the structure, in particular having an insufficient tolerance in terms of impact. For comparison, a blade airfoil profile 24 that has been thickened according to the invention is plotted using the dashed lines, the blade airfoil thickness d being increased in particular in a region of the front edge 25, this improving the impact resistance.

Figure 3:
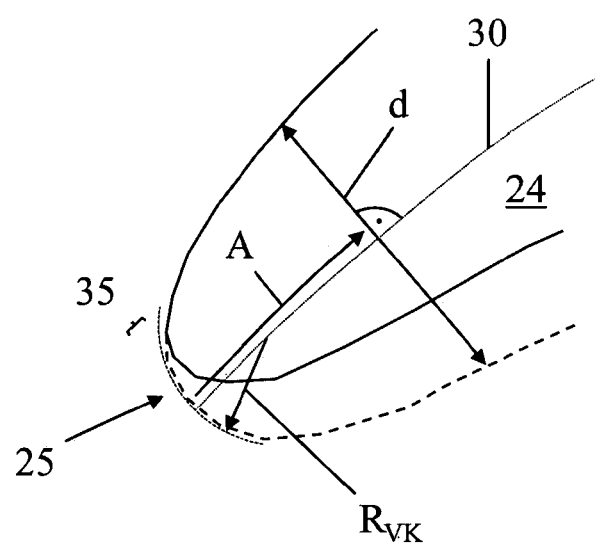
FIG. 3 shows a detailed view of the blade airfoil profile according to FIG. 2 for illustrating the thickening on the front edge.

FIG. 3 shows a region on the front edge 25 in detail. The blade airfoil thickness d is measured perpendicularly to the skeletal line 30. The blade airfoil profile 24 at the front edge 25 has front edge radius $R_{VK}$ (a corresponding arc is illustrated by dotted lines). Presently, a front edge region 35, across which the rotor blade airfoil 23 has the front edge radius $R_{VK}$, extends across approximately 0.15 mm. In order for the front edge radius $R_{VK}$ to be determined, a circle or arc, respectively, the center of the latter being on the skeletal line 30, can be fitted into the front edge region 35 at a plurality of points, for example by the "best fit" method.

In the rotor blade airfoil 23, the thickening is set according to the invention such that $$\frac{2 \times d}{R_{VK}^2} - d \qquad \text{(Formula 1)}$$

is between 0.6 and 5.5. The thickening achieved therewith is advantageous not only in mechanical-structural but also aerodynamical terms; cf. the introductory description in detail. The thickening is provided in particular in a region proximal to the front edge. In terms of the radial extent of the rotor blade airfoil 23, thus the rotor blade airfoil height H (cf. FIG. 1), said rotor blade airfoil 23 can be correspondingly be optimized above all in a radially outer portion.

Figure 4:
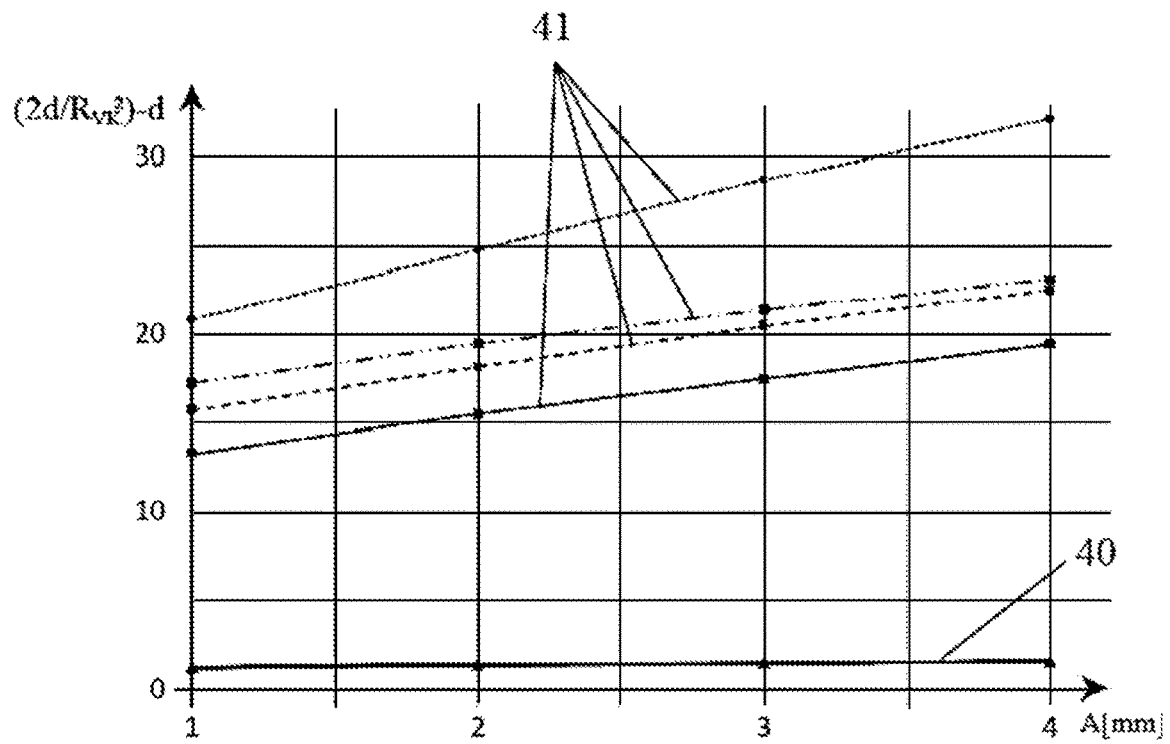
FIG. 4 shows a diagram for illustrating the ratio between the front edge radius and the blade airfoil thickness, plotted over the spacing from the front edge.

FIG. 4 illustrates the ratio according to the preceding formula for different spacings A from the front edge 25 (cf. FIG. 3), said spacings A being plotted in millimeters here. The curve 40 herein shows the values measured on the blade airfoil profile 24 optimized according to the invention; for comparison, the curves 41 show values measured on different profiles which are in each case optimized solely in aerodynamic terms.

Figure 5:
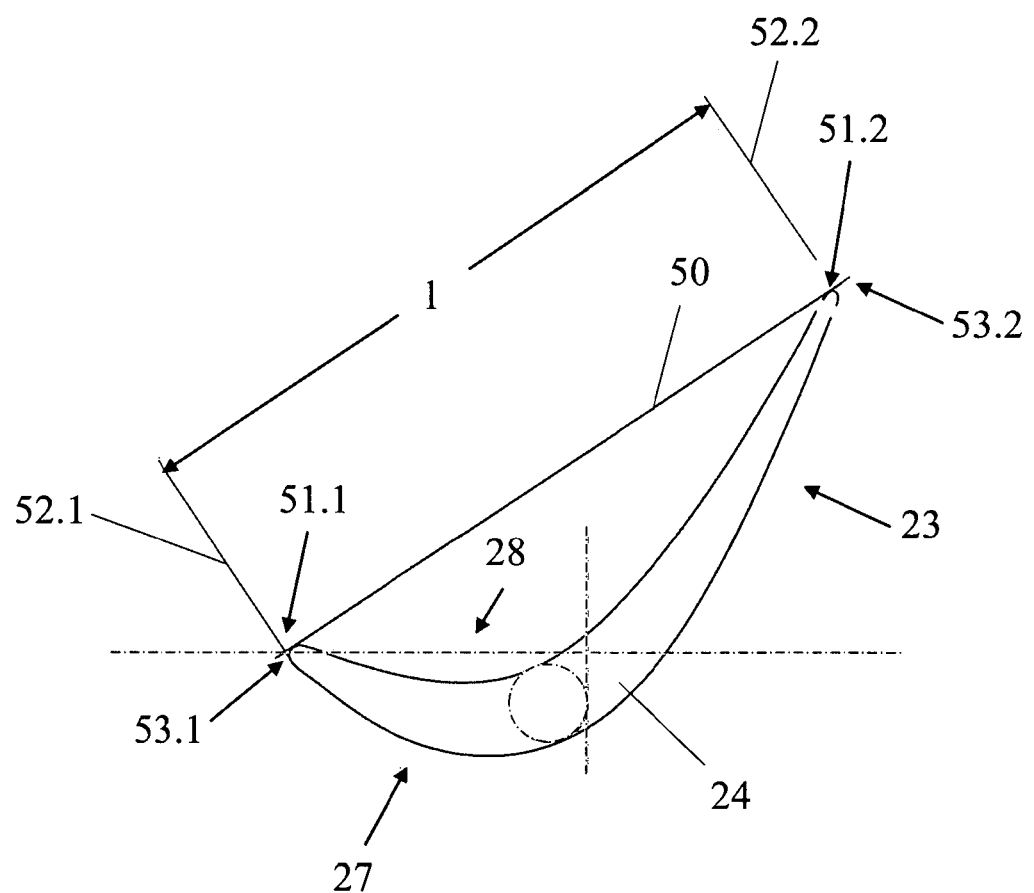
FIG. 5 shows the determination of the chord length on a blade airfoil profile.

FIG. 5 shows how the chord length l is determined on a blade airfoil profile 24. Said chord length l is measured along a connecting tangent 50 which on the pressure side is placed on the blade airfoil profile 24 and on the latter has an axially front contact point 51.1 and an axially rear contact point 51.2. The chord length l is then measured between two further tangents 52.1, 52.2 which lie in each case so as to be perpendicular to the connecting tangent 50, wherein the tangent 52.1 axially at the front has a contact point 53.1 and the tangent 52.2 axially at the rear has a contact point 53.2.

Figure 6:
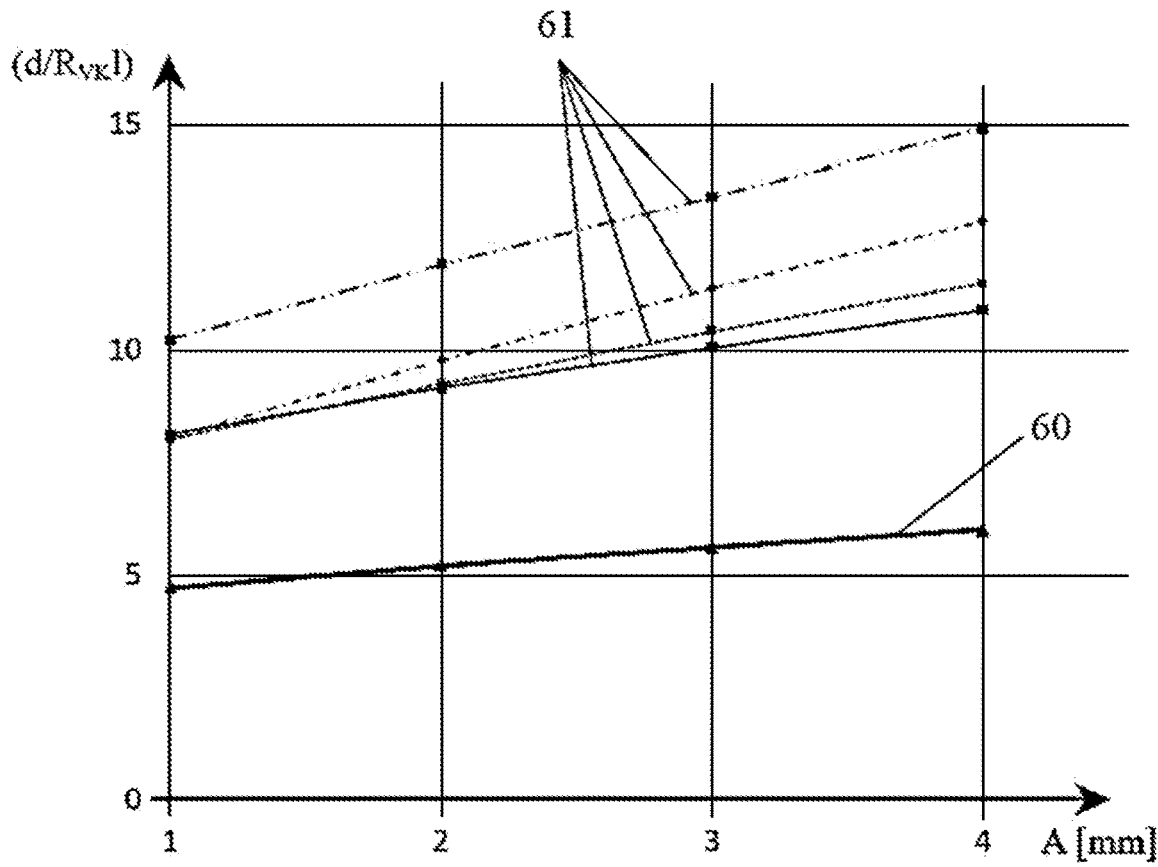
FIG. 6 shows a ratio between the blade airfoil thickness, the chord length and the front edge radius, plotted over the spacing from the front edge.

FIG. 6 illustrates a ratio between the blade airfoil thickness d, the front edge radius $R_{VK}$ and the chord length l set according to the invention, again plotted over the spacing A measured from the front edge 25 along the skeletal line 30. The curve 60 here is obtained by means of a blade airfoil profile 24 optimized in structural as well as aerodynamic terms, whereas the curves 61 for comparison reflect profiles that are optimized solely in aerodynamic terms.

LIST OF REFERENCE SIGNS

Turbomachine
1a Compressor
1b Combustion chamber
1c Turbine
1ca High-pressure turbine module
1cb Low-pressure turbine module
2 Gas duct
3 Longitudinal axis
4 Fan
5 Gearbox
20 Rotor blade
23 Rotor blade airfoil
24 Blade airfoil profile
25 Front edge
26 Rear edge
27 Suction side
28 Pressure side
30 Skeletal line
35 Front edge region
40 Curve (optimized according to the invention)
41 Curve (optimized solely in aerodynamic terms)
50 Connecting tangent
51.1 Axially front contact point
51.2 Axially rear contact point
52.1, 52.2 Further tangents
53.2 Axially rear contact point
60 Curve (optimized according to the invention)
61 Curve (optimized solely in aerodynamic terms)
A Spacings
d Blade airfoil thickness
H Rotor blade airfoil height
L Skeletal line length
l Chord length
$R_{VK}$ Front edge radius

What is claimed is:

1. A rotor blade for arrangement in a gas duct of a turbomachine, wherein the rotor blade comprises a rotor blade airfoil which, when viewed in a tangential section, has a blade airfoil profile comprising
   a front edge radius $R_{VK}$, and
   a blade airfoil thickness d,
the blade airfoil profile being thickened at least in sections, and the blade airfoil thickness d being set with respect to the front edge radius $R_{VK}$ such that at least at a spacing A of 1 mm or 0.5 mm, measured along a skeletal line of the blade airfoil from the front edge thereof, $$(2 \times d/R_{VK}^2) - d \leq 5.5$$

and wherein:
   i) the blade airfoil thickness d in a front edge region at the spacing A is from 0.5 mm to 5 mm; and/or
   (ii) in terms of a chord length l measured on the blade airfoil profile, the blade airfoil thickness d is set at a ratio to the front edge radius $R_{VK}$ and the chord length l such that $4.0 \leq d/(R_{VK} \times l) \leq 7.0$; and/or
   iii) in terms of the chord length l measured on the blade airfoil profile, at least at the spacing A between 1.0 mm and 2.0 mm that is measured along the skeletal line of the blade airfoil profile from the front edge thereof, the blade airfoil thickness d is set with respect to the front edge radius $R_{VK}$ and the chord length l such that $d/(R_{VK} \times l) \leq 7.2$; and/or
   iv) the blade airfoil thickness d is set with respect to the front edge radius $R_{VK}$ such that $0.6 \leq (2 \times d/R_{VK}^2) - d \leq 4.0$.

2. The rotor blade of claim 1, wherein the front edge radius $R_{VK}$ ranges from 0.2 mm to 1.8 mm.

3. The rotor blade of claim 1, wherein the front edge radius $R_{VK}$ ranges from 0.6 mm to 1.4 mm.

4. The rotor blade of claim 1, wherein the front edge radius $R_{VK}$ ranges from 0.7 mm to 1.4 mm.

5. The rotor blade of claim 1, wherein the blade airfoil thickness d in the front edge region at the spacing A is from 0.5 mm to 5 mm.

6. The rotor blade of claim 1, wherein the blade airfoil thickness d in the front edge region at the spacing A is from 1.5 mm to 4 mm.

7. The rotor blade of claim 1, wherein the blade airfoil thickness d in the front edge region at the spacing A is from 2 mm to 2.5 mm.

8. The rotor blade of claim 1, wherein, in terms of a rotor blade airfoil height H measured from radially inside to radially outside of the rotor blade airfoil, the blade airfoil profile is thickened at radial positions of at least from 60% to 90% of the rotor blade airfoil height H.

9. The rotor blade of claim 1, wherein the blade airfoil thickness d is set at the ratio to the front edge radius $R_{VK}$ and the chord length l such that $4.0 \leq d/(R_{VK} \times l) \leq 7.0$.

10. The rotor blade of claim 1, wherein at least at the spacing A between 1.0 mm and 2.0 mm that is measured along the skeletal line of the blade airfoil profile from the front edge thereof, the blade airfoil thickness d is set with respect to the front edge radius $R_{VK}$ and the chord length l such that $d/(R_{VK} \times l) \leq 7.2$.

11. The rotor blade of claim 1, wherein at least the rotor blade airfoil is made from a brittle material which has a maximum total elongation of less than 6%.

12. The rotor blade of claim 1, wherein at least the rotor blade airfoil is made from a high-temperature-resistant material which is suitable for use in temperatures of up to at least 700° C.

13. The rotor blade of claim 1, wherein the rotor blade airfoil is a solid profile.

14. A turbine module for an aircraft engine, wherein the module comprises the rotor blade of claim 1.

15. An aircraft engine, wherein the aircraft engine comprises the turbine module of claim 14.

16. The rotor blade of claim 1, wherein the blade airfoil thickness d is set with respect to the front edge radius $R_{VK}$ such that $$0.6 \leq (2 \times d/R_{VK}^2) - d \leq 4.0.$$

17. A rotor blade for arrangement in a gas duct of a turbomachine, wherein the rotor blade comprises a rotor blade airfoil which, when viewed in a tangential section, has a blade airfoil profile comprising
- a front edge radius $R_{VK}$, and
- a blade airfoil thickness d, the blade airfoil profile being thickened at least in sections, and the blade airfoil thickness d being set with respect to the front edge radius $R_{VK}$ such that $$(2 \times d/R_{VK}^2) - d \leq 5.5$$

and wherein, in terms of a chord length l measured on the blade airfoil profile, the blade airfoil thickness d is set with respect to the front edge radius $R_{VK}$ and the chord length l such that $$4.0 \leq d/(R_{VK} \times l) \leq 7.2.$$

\* \* \* \* \*